United States Patent [19]
Hill et al.

[11] Patent Number: 5,216,739
[45] Date of Patent: Jun. 1, 1993

[54] METHOD OF CREATING AN INDEX GRATING IN AN OPTICAL FIBER AND A MODE CONVERTER USING THE INDEX GRATING

[75] Inventors: Kenneth O. Hill, Kanata; Bernard Y. Malo, Gatineau; Francois Bilodeau; Derwyn C. Johnson, both of Nepean, all of Canada

[73] Assignee: Her Majesty the Queen in right of Canada, as represented by the Minister of Communications, Ottawa, Canada

[21] Appl. No.: 811,299

[22] Filed: Dec. 20, 1991

Related U.S. Application Data

[63] Continuation-in-part of Ser. No. 656,462, Feb. 19, 1991, Pat. No. 5,104,209.

[51] Int. Cl.$^5$ .............. G02B 6/12; G02B 6/14
[52] U.S. Cl. .................... 385/123; 385/125; 359/566
[58] Field of Search ............ 385/37, 15, 123, 125; 359/566

[56] References Cited

U.S. PATENT DOCUMENTS

| | | | |
|---|---|---|---|
| 4,725,110 | 2/1988 | Glenn et al. | 385/100 |
| 4,807,950 | 2/1989 | Glenn et al. | 385/123 |
| 4,974,930 | 12/1990 | Blyler, Jr. et al. | 385/15 X |
| 5,104,209 | 4/1992 | Hill et al. | 385/37 X |

Primary Examiner—Akm E. Ullah
Attorney, Agent, or Firm—Pascal & Associates

[57] ABSTRACT

Efficient, narrow-band rocking filters have been made in polarization-maintaining monomode optical fiber by photoinducing periodic birefringent gratings along the length of the fiber. These gratings, fabricated with a period chosen to provide synchronous coupling between the two principal states of polarization of the $LP_{01}$ mode at a preselected wavelength, gently rock to and fro the principal polarization axes of the fiber. To photoinduce the grating, the fiber is exposed periodically along its length to a U.V. light beam which is incident at right angles to the geometrical axis of the fiber and is directed $\pi/4$ radians with respect to the principal axes. Efficient polarization mode conversion at 1.3 μm with the fiber gratings are obtained.

16 Claims, 5 Drawing Sheets

METHOD OF CREATING AN INDEX GRATING IN AN OPTICAL FIBER AND A MODE CONVERTER USING THE INDEX GRATING

This is a continuation-in-part of copending patent application Ser. No. 656,462 filed Feb. 19, 1991, now U.S. Pat. No. 5,104,209.

FIELD OF THE INVENTION

This invention relates to optical fibers and in particular to a method of making a refractive index grating in an optical fiber and to a rocking filter made thereby.

BACKGROUND TO THE INVENTION

Light induced refractive index changes in the core of an optical fiber were first observed in Ge-doped optical fibers, as described in Applied Physics Letters 32(10), pp 647–649, 1978 "Photosensitivity in Optical Fiber Waveguides: Application to Filter Fabrication" by K. O. Hill et al, and in U.S. Pat. No. 4,474,427 issued Oct. 2, 1984. To produce the changes, light having a wavelength in the visible region was launched into the core of a Ge-doped fiber strand. The light was reflected from the end of the fiber. The forward propagating light interfered with the backward propagating light to form a standing wave pattern with a period corresponding to half the wavelength of the writing light. Through a photosensitive effect in the fiber, a refractive index grating having this period was written in the core of the fiber.

With the above technique, gratings could only be fabricated with reflected light having wavelengths close to that of the writing light. An improvement to that process was described in U.S. Pat. No. 4,807,950 issued Feb. 28, 1989. In that patent the gratings were produced in the fiber by illuminating the fiber from the side with coherent ultraviolet radiation of 245 nm wavelength. By using two light beams, an interference pattern is set up along the length of the fiber. The period of the pattern could be controlled by controlling the angles of the interfering beams. Therefore index gratings could be written in the fiber which would reflect light at longer wavelengths.

A fiber optic converter was created by impressing periodic microbends in the fiber along its length, at a correct period between bends to induce mode coupling. The microbends were usually induced by laying a flat metal block with fine parallel grooves over the fiber. Another approach was to launch into a two-mode fiber light with high power in both modes. The interference pattern of the two propagating modes induced in the fiber core a permanent index of diffraction grating of the correct period for mode coupling. If light is now launched into one of the modes of the two mode fiber, the index grating couples it with the other mode.

Internal writing with core-guided light has the disadvantage that it usually limits the resonance of the filters that are produced thereby to the writing wavelength and perhaps to a few related wavelengths. This limitation can be overcome by resorting to external writing. An external point-by-point writing technique as described in copending U.S. patent application Ser. No. 656,462 filed Feb. 19, 1991 and assigned to the same assignee is useful for the fabrication of very long periodic and a periodic grating structures, the order of meters, that can act as intermode converters. The technique is termed an external writing technique because the light used for writing the index perturbation point-by-point irradiates the optical fiber from the side. In contrast to internal techniques, external writing techniques have the advantage that mode converters can be fabricated in standard optical fiber and operated at wavelengths used in optical communications systems.

SUMMARY OF THE INVENTION

The present invention is a new way of fabricating rocking filters (polarization mode converters), which filters were first reported by Stolen et al in the publication "In-Line Fiber-Polarization-Rocking Detector and Filter", Opt. Lett. 1984, 9, pp 300–303. Rather than using periodic mechanical twisting as described therein, filters according to the present invention are prepared in photosensitive birefringent fiber using a point-by-point external writing technique in a novel way to photoinduce birefringence in the core of the fiber, by modifying the writing conditions.

Rocking filters are the only bound mode converter devices that can be fabricated in monomode fiber and employed together with readily available polarizing directional couplers for wavelength selective routing of optical signals.

Photo-induced birefringence in optical fiber has been reported previously and used to fabricate rocking filters but only by using the internal writing technique. The axes of such a photo-induced birefringence are directed along the direction of polarization of the light that propagates in the core of the fiber and that is responsible for inducing it.

In accordance with the present invention an external writing beam is used, incident at right angles to the geometrical axis of the fiber, directed $\pi/4$ radians with respect to the fiber's principal axes, and containing an electric field polarization component orthogonal to the longitudinal axis of the fiber, to reorient, by rotation, the fiber's principal axes.

We have determined experimentally that the principal axes of a birefringent fiber can be rotated about the fiber's longitudinal axis by using external writing with ultraviolet light and that the rotation, even in a high birefringence fiber, is large enough to obtain high conversion efficiencies between the principal polarization modes of the fiber in reasonable lengths of fiber. Therefore, by periodic exposure of the fiber with a period equal to the beat length (associated with a chosen wavelength) efficient rocking filters can be made for polarization mode conversion at that wavelength.

In accordance with an embodiment of the present invention, a rocking filter is created by the steps of exposing an optical fiber periodically along its length to an ultraviolet light beam which is incident at right angles to the geometric axis of the fiber, is directed $\pi/4$ radians with respect to the principal polarization axes of the fiber and contains an electric field component which is orthogonal to the longitudinal axis of the fiber.

Preferably the periodicity of the exposure positions of the fiber is equal to the beat length of a predetermined wavelength.

It is also preferred that the exposure step includes pulsing ultraviolet light more then ten times per exposed point at a high repetition rate, e.g. 50 Hz. Each exposed point can be pulsed e.g. 250 times.

In accordance with another embodiment, a rocking filter is created by the steps of (a) disposing a slit mask containing a slit over a side of an optical fiber, the slit having an angle which is at right angles to the geometric axis of the fiber, the mask plane being $\pi/4$ radians with respect to the principal polarization axes of the fiber, and (b) illuminating the fiber through the slit mask with an ultraviolet light beam which is directed $\pi/4$ radians with respect to the principal polarization axes of the fiber and containing an electric field component which is orthogonal to the longitudinal axis of the fiber, (c) moving the slit mask a predetermined distance along the fiber, and (d) repeating steps (a), (b) and (c) a predetermined number of times.

BRIEF INTRODUCTION TO THE DRAWINGS

A better understanding of the invention will be obtained by reference to the detailed description below, in conjunction with the following drawings, in which:

FIG. 2 illustrates use of that invention to create thermoluminescence, FIG. 3 are curves of calculated wavelength dependence of the grating period for an $LP_{01}$ to $LP_{02}$ mode converter, FIG. 4 are curves of spectral response of intermodal $LP_{01}$–$LP_{02}$ coupling as the grating is tuned by stretching.

DESCRIPTION OF THE INVENTION

Figure 1:
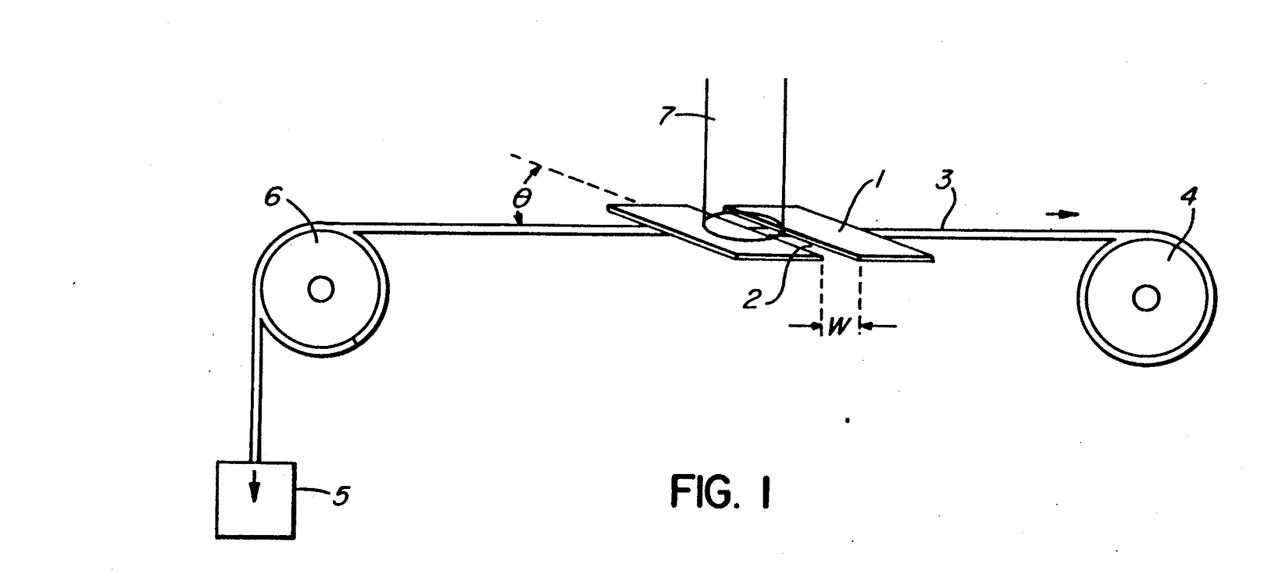
FIG. 1 is a schematic partly perspective view of the invention in the parent application and apparatus used to fabricate it.
Figure 1A:
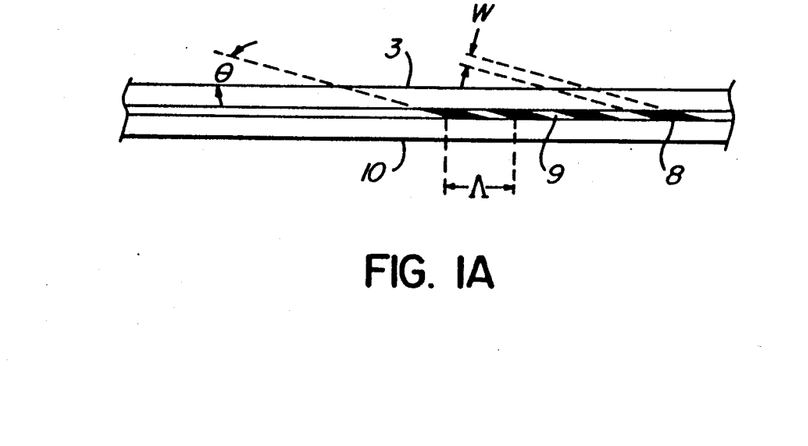
FIG. 1A is an enlargement of the fiber portion containing the grating.

With reference to FIGS. 1 and 1A, a mask 1 having a slit 2 is placed over and in contact with or very close to an optical fiber 3.

In order to handle the optical fiber, in producing a successful prototype, one end was wrapped around a cylinder 4 which had radius of 8.2 centimeters, the cylinder having been attached to the shaft of a precision dc motor (not shown). The other end of the fiber was attached to a weight 5, and passed over a pulley 6 having similar diameter as the cylinder 4.

An unfocused monochromatic ultraviolet light beam 7 is impinged on the optical fiber through the slit 2 in the mask. The angle $\theta$ of the edges of the slit, i.e. the blaze angle is predetermined to provide a proper grating blaze, as will be described below.

In a successful embodiment, the ultraviolet light was produced by a Lumonics series Te-260-2 Excimer laser. The active gas in the laser was KrF, producing ultraviolet light at 249 nm. The laser was pulsed once or several times to create a single grating line 8 in the core 9 of fiber 3. The core 9 is of course covered by cladding 10.

The laser pulse duration was 8 ns with an average energy of 240 mJ per pulse, a peak power of 30 MW and a cross-sectional area of 3 cm by 0.7 cm.

In order to produce a full grating the fiber and mask are moved axially relative to each other along the axis of the optical fiber. At the correct position for the next grating line, the light beam is pulsed. Either the mask can be moved or the fiber can be moved.

In a preferred embodiment, the motor turns and the straight portion of the fiber between the pulley and the rotary stage is translated in front of the slit. The motor stops at each required point (stepping) and a one or more laser pulses impinge on the fiber through the slit. Alternatively the motor can turn continuously and the laser flashed at regular intervals. The accuracy of the grating in the first case depends on the positional accuracy of the motor. In the second case the uniformity of the motor speed and of the laser flashes determine the grating accuracy.

Different grating periods can be used to fabricate gratings for producing mode converters, for example, at different wavelengths. Mode conversion gratings at about ten different wavelengths were successfully fabricated in the 600 nm to 900 nm region. The increased index of refraction produced by the ultraviolet radiation at every grating step was large enough to produce 100% coupling efficiency after 200-300 steps (200-300 lines). The spectral response of such a grating has been found to be fairly broad. To produce a narrower response gratings were fabricated with up to 1,000 steps. This produced an over-coupled grating. After 100% of the $LP_{01}$ mode constituent is coupled to an $LP_{11}$ mode constituent, the same periodicity grating then converts the light back to $LP_{01}$ mode constituent.

The grating was heat treated by the use of a heating wire in one case, and a heating coil in another case, to partly erase and thus reduce the amplitude of the index of refraction grating. After heating, the desired grating coupling strength was found to be achieved.

It should be noted that by heating the optical fiber to a sufficiently high temperature, the index grating could be erased. Thus the present invention provides a technique not only for writing the index grating but also for erasing it.

The gratings were produced in Corning Telecommunication fiber having cut-off wavelength at 1.1 μm. A pitch of 590 μm gave a $LP_{01} \leftrightarrow LP_{11}$ mode conversion grating of 820 nm in first order. Efficient intermodal coupling requires not only a grating of the correct period but also that the individual index perturbations should be blazed, i.e. tilted, so that the interface plane between perturbed and unperturbed index regions is blazed at about 2°-3° to the optical fiber axis. The blaze angle at which this grating was written is determined by the beat characteristics of the $LP_{01}$ and the $LP_{11}$ modes of the fiber. The need for a blaze can be understood in terms of holography by considering the $LP_{01}$ mode as the reference beam and the $LP_{11}$ as the object beam. The interference of these two modes traces out as a function of position along the length of the fiber an intensity distribution that is maximum first on one side of the fiber core and then on the other side as the phase difference between the two modes increases by $\pi$. The refractive index variation of an ideal grating would duplicate this intensity distribution substantially exactly.

In a successful prototype, the beat characteristic was approximated by periodic exposure of the fiber core through a slit having width of 12 μm angled at an angle $\theta$ of 2°-3° with respect to the fiber axis, to provide the correct blaze for light at 820 nm. In this case the index perturbation in the fiber core would have an oblong or rhombic cross-sectional shape as shown in FIG. 1. To obtain mode conversion at other wavelengths both the period and blaze angle of the grating (as well as the slit width) should be appropriately adjusted. It was found that grating mode conversion efficiency is reduced considerably for blaze angles differing from the optimal blaze by as little as 1°. However it was determined that for certain mode conversions such as $LP_{01}$-$LP_{02}$ the blaze angle $\theta$ should be 90° to the fiber axis, i.e. no blaze, and the index perturbations would have a rectangular shape.

Figure 2:
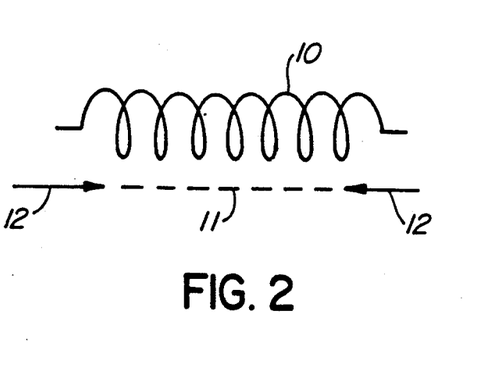

FIG. 2 illustrates photoluminescence resulting from heating of the fiber. A heating coil 10 is placed next to the fiber. It was found that as the fiber was heated, the regions (lines) of the optical fiber that were irradiated by ultraviolet light showed created thermoluminescence, indicated at 11 between the arrows 12—12. An actual photograph of the thermal luminescencing fiber was in inverse contrast to the drawing of FIG. 2.

The index grating pitch for a mode converter can be determined using the following relationship:

$$\Delta \beta \Lambda = 2\pi$$

where $\Lambda$ is the period of the grating, and $\Delta\beta$ is the difference in the propagation constants of the two modes that are desired to be coupled in the mode coupler created using the method of the present invention.

$\beta = (2\pi/\lambda) \times$ (the effective index of the mode).

The technique for determining the pitch of the grating is as follows:

1. Choose the wavelength $\lambda$ that the index grating is to resonate at.
2. $\beta$ for $LP_{01}$ and $LP_{02}$ at the chosen wavelength is then calculated.
3. $\Delta\beta$ for determining the pitch (period) $\Lambda$ is then calculated.
4. $\Lambda$, the index grating pitch is then calculated from the relationship given above.
5. The width W of the slit in the slit mask should be less than $\Lambda$.

It has been found that fiber cladding forms a cylindrical lens focusing the light toward the core of the fiber, thus reducing the effect of the mask being at various distances from the surface of the core.

The method described herein for creating the index grating can be used to fabricate Bragg reflectors in optical fiber or distributed feedback mirrors on the end of Er-doped optical fiber amplifier, thus providing a practical means for making a tunable narrow frequency laser. In this case the grating pitch $\Lambda$ is determined from $$\Lambda = \frac{1}{2} \frac{\lambda}{n_{eff}}$$

where $\lambda$ is the wavelength of the reflected light and $n_{eff}$ is the effective index at $\lambda$ for the $LP_{01}$ mode. Further, by writing a grating of an appropriate period, phase matching of the light waves in four photon processes can also be achieved. A fiber containing the index grating can be embedded in materials to provide a technique for monitoring the strains in a structure.

It should be noted that the invention is not restricted to a slit mask containing single slit. The mask could contain many slits. In this case it may be advantageous to insert imaging optics between the mask and the fiber in order to reduce the size of the image of the mask on the fiber and thereby provide a means for controlling the dimensions of the index grating.

It should also be noted that the invention is not restricted to Ge-doped optical fibers. It may be applicable to a variety of different fibers. For example, we have successfully created a index grating in Ge-free $Eu^{2+}$:$Al_2O_3$ doped core fiber. The fiber core diameter of 11.5 $\mu$m, cladding diameter of 124.8 $\mu$m and numerical aperture 0.08 was fabricated using MCVD and the Brown University aerosol dopant delivery method.

Using the latter fiber, $LP_{01}$-$LP_{11}$ fiber mode conversion gratings were made having $\Lambda = 655$ $\mu$m and $\theta = 2.5°$ blaze angle, approximately 30 cms long, using the fabrication technique herein described. The KrF Excimer laser source exposed the fiber. A successful prototype mode converter using the method described above converted light between the $LP_{01}$ and $LP_{11}$ modes operating in the 600-900 nm wavelength region. As originally made, the grating was overcoupled but then was partly heat-erased as described above to reduce the coupling to 50%, thereby achieving a cleaner spectral response. Gratings written with ultraviolet light began to be erased at the same temperature as in the case of Ge-doped fiber, i.e. at about 350° C. Complete erasure occurred at 500° C.

It appears also that at least metaphosphate, lithium borate and silicate bulk glasses, the latter incorporating various network modifiers, doped with $Eu^{3+}$ are useful to form fibers in which index gratings using the method described above can be made.

The index grating writing technique described above has the advantage that mode converters can be fabricated in standard optical fiber and operated at wavelengths appropriate to optical communication systems.

It has been observed that $LP_{01} \leftrightarrow LP_{11}$ mode converters have a complicated wavelength spectral response. The many peaks are a result of the $LP_{11}$ approximate mode corresponding to four true modes in a fiber, i.e. the fiber is not really bimodal. In the fabrication of practical two-mode optical fiber devices, a mode converter which operates in a narrow bandwidth about a single wavelength is preferable. Single peak spectral responses require two-mode fibers in which the higher order mode has only one mode constituent. This may be accomplished by using a special two-mode fiber, e.g. having an elliptical core, or by writing gratings that couple the $LP_{01}$ to the $LP_{02}$ mode where higher order mode $LP_{02}$ is a single mode. Such $LP_{01}$-$LP_{02}$ mode converters have been created using both the fabrication process described above.

To write the grating for the $LP_{01}$-$LP_{02}$ mode converter in a manner described with reference to FIG. 1, the technique that is used is similar to that used in the fabrication of the $LP_{01}$-$LP_{11}$ mode converter. The principal differences are that the grating pitch is selected to permit coupling between the $LP_{01}$ and $LP_{02}$ modes and the interface plane between the perturbed and unperturbed index regions is normal to the fiber axis, i.e. the gratings are not blazed and the edges of the mask slit are 90° to the axis of the fiber. Blazing is not required because both modes have circular symmetry.

The technique for determining the period of the grating is as described earlier.

Figure 3:
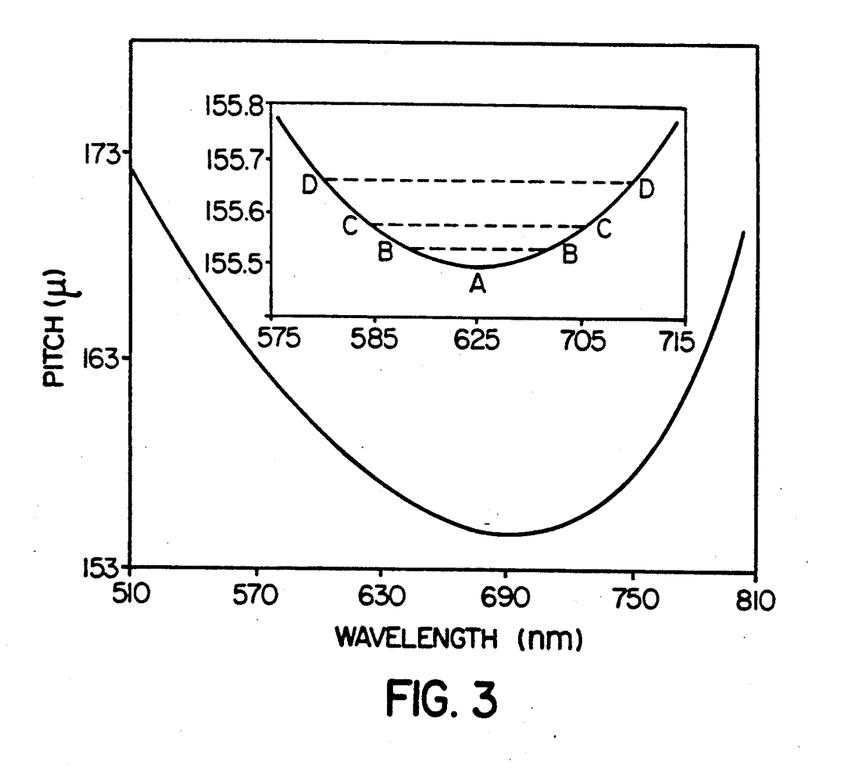

FIG. 3 are graphs showing the wavelength dependence of the grating period for an $LP_{01}$ to $LP_{02}$ mode converter, which was computed numerically, for first order gratings in an optical fiber to yield intermodal coupling in the wavelength region 510 nm to 810 nm. Towards the longer wavelengths, the curve does not extend beyond 807 nm because the $LP_{02}$ is cut off. The curve also has a minimum period for which the phase matching condition LP$_{01}$-LP$_{02}$ intermodal coupling is satisfied. Thus for gratings that have a period shorter than the minimum period, intermodal coupling is not possible. On the other hand, for gratings having periods longer than the minimum period there can be two wavelengths for which intermodal coupling is achievable. For a grating having a period at the curve minimum LP$_{01}$-LP$_{02}$ intermodal coupling occurs at a single wavelength.

Figure 4:
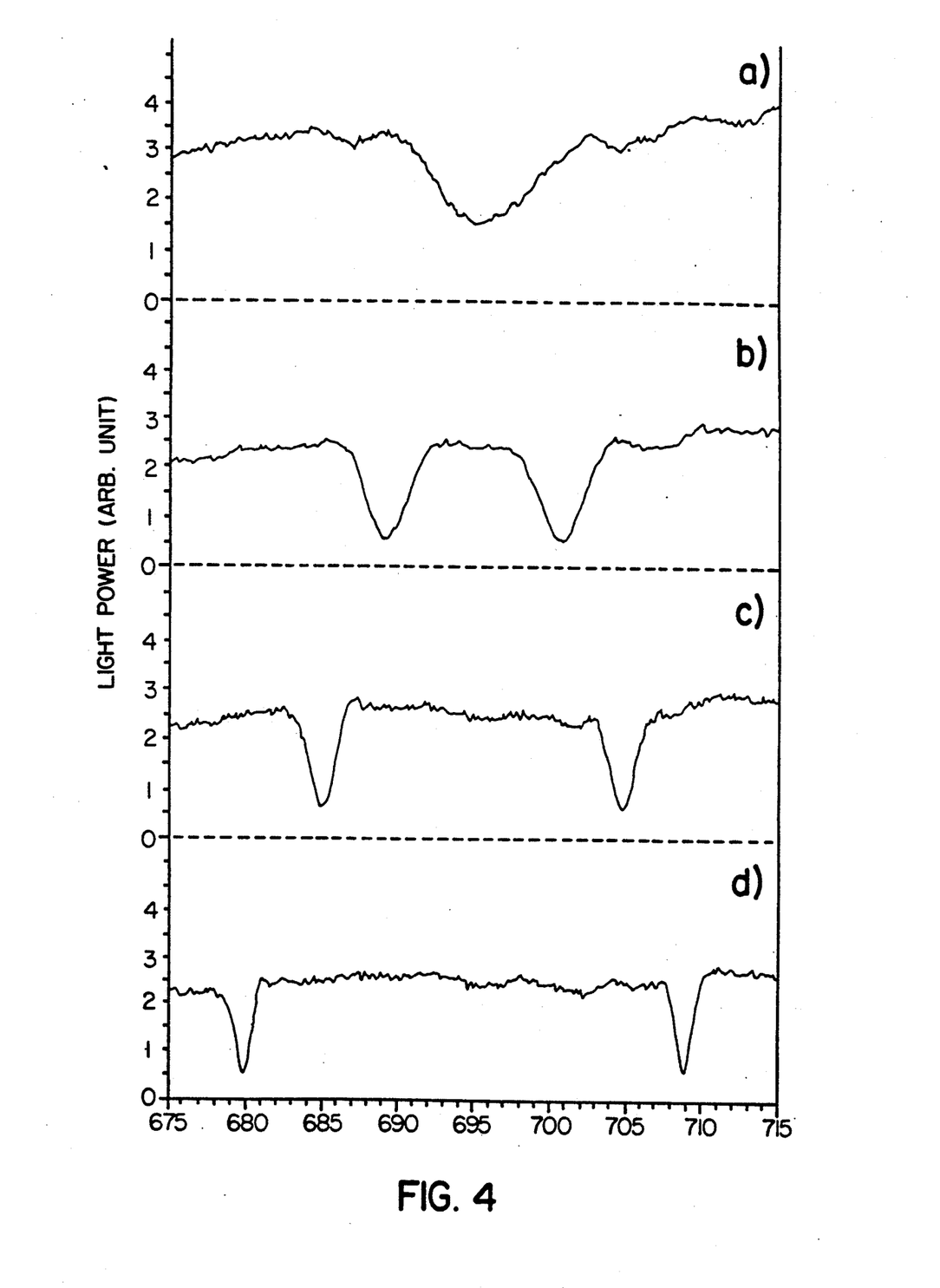

A mode converter grating of length 1.7 m was written in an optical fiber with a pitch, $\Lambda$ of 155.5 $\mu$m, slightly shorter than the minimum wavelength. By stretching the fiber, the grating period could be tuned through the various phase matching regions of no coupling, single wavelength coupling, and two wavelength coupling. The results of measurements of spectral response of the intermodal coupling, as the grating is tuned by stretching, is shown in FIG. 4. With the grating pitch tuned to the minimum wavelength, intermodal coupling occurs at a single wavelength of 696 nm with an efficiency of 50% and a line width of 7 nm. An additional stretching of the fiber resulted in the appearance of two peaks in spectral response curves (curves b, c and d). The separation between the peaks increases with increasing applied tension to the fiber. At coupling efficiency of 70% and a line width of 1.2 nm was demonstrated.

Thus using the invention described herein, the first LP$_{01}$-LP$_{02}$ mode converter has been made based on a fiber index grating made by fiber photosensitivity. The mode converter has a simple highly selective spectral response which is useful in the fabrication of two-mode fiber devices.

Other applications of intermodal gratings in fibers can be in the characterization of optical fibers and as optical fiber sensors.

In the description below, the amount of rotation of the principal axes of the intrinsic birefringents of a polarization maintaining fiber in terms of the photoinduced birefringents is calculated, and related to the coupling coefficient of a rocking filter.

An orthogonal frame of reference (x,y,z) is chosen with z directed along the longitudinal axis of the fiber and (x,y,) chosen to coincide with the principal axes of birefringence of the fiber. The principal dielectric constant components describing the intrinsic birefringence of the fiber are $\epsilon_x$ and $\epsilon_y$. Incident on the fiber at right angles to z a beam of light capable of inducing birefringence in the fiber core and therefore containing a polarization component perpendicular to z is assumed. The beam makes an angle $\theta$ with respect to the x-axis. The beam direction defines an x' and an orthogonal axis y' and therefore a frame of reference (x',y',z'). We assume further that the change in the vector components of the displacement D measured along (x',y') are given by $\Delta D_{x'} = \Delta\epsilon_{x'}E_{x'}$ and $\Delta D_{y'} = \Delta\epsilon_{y'}E_{y'}$, where E is the electric field vector and $\Delta\epsilon_{x'}$ and $\Delta\epsilon_{y'}$ are the photoinduced changes in the (x',y') components of the dielectric constant (of the fiber core).

With this framework the angle of rotation $\Psi$ about z of the principal birefringence axes of the fiber is given by $$\tan(2\Psi) = \frac{(\Delta\epsilon_{x'} - \Delta\epsilon_{y'})\sin(2\theta)}{(\epsilon_x - \epsilon_y) + (\Delta\epsilon_{x'} - \Delta\epsilon_{y'})\cos(2\theta)}$$

In terms of the index of refraction n, the relation $\delta\epsilon/\epsilon = 2\delta n/n$ allows us to calculate the rotation $\Psi$ in terms of the principal indices of refraction of the fiber. In our experiments $\theta = \pi/4$ and $(\epsilon_x - \epsilon_y) >> (\Delta\epsilon_{x'} - \Delta\epsilon_{y'})$; therefore the rotation $\Psi$ is small and we can write $$\Psi = \frac{(\Delta n_{x'} - \Delta n_{y'})}{2B}$$

where the normalized birefringence of the fiber $B = (n_x - n_y)$ and the numerator is the photoinduced birefringence. Written in terms of B, the beat length for wavelength $\lambda$ is $L_o = \lambda/B$.

The coupling coefficient $\kappa = 2\Psi/L_r$ where $L_r$ is the rotation period. The rotation period (grating period) is determined by $L_r = L_o$ at the resonant wavelength for polarization mode conversion. This uniform rotation model is adequate to describe the coupling characteristics of birefringent fiber gratings written point-by-point.

A Ge-doped core fiber was used in constructing an operating prototype of the present invention, and which had a D-shaped cladding and elliptical core, and polarization-maintaining with cut-off=960 nm and beat length $L_o = 1.02$ cm at $\lambda = 1292$ nm. The fiber had core/cladding $\Delta n = 0.031$, an elliptical core size $1.5 \times 3$ $\mu$m and polarization holding of 45 dBm.

The ultraviolet source was a Lumonix excimer laser operated at 248 nm with a beam profile of $0.7 \times 2$ cm$^2$, a pulse duration of 12 nsec and a maximum pulse repetition rate of 75 Hz. The unfocused energy density per pulse was 100 mJ per cm$^2$.

Figure 5:
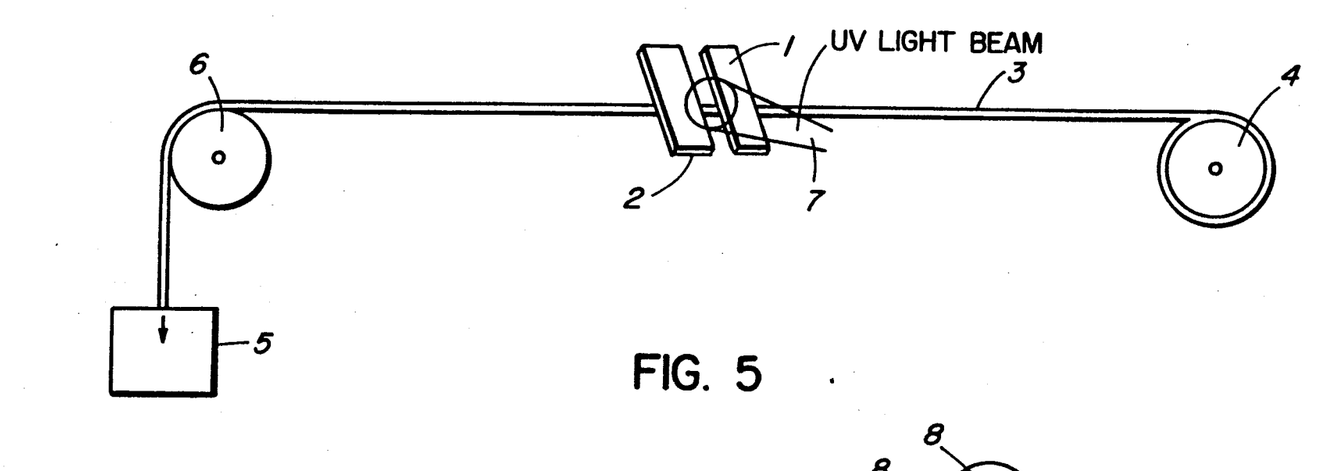
FIG. 5 is a schematic partly perspective view of apparatus used to carry out the present invention.
Figure 5A:
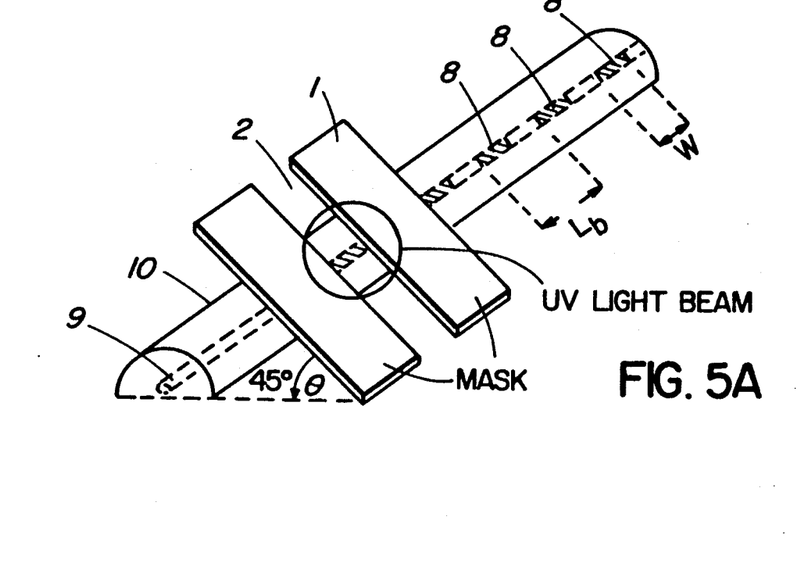
FIG. 5A is an enlargement of the fiber portion containing the grating.

The experimental setup is shown in FIGS. 5A and 5B and is similar to and carries similar reference numerals as FIG. 1. However in this case the period of the grating is made equal to the polarization beat length of the fiber (rather than the LP$_{01}\leftrightarrow$LP$_{11}$ beat length) and that the number of light pulses (250) used to expose a point on the fiber is many fold the one or two pulses per point described for the parent application. Exposure (exposed width $W = L_o/2$ per point), was carried out at a high repetition rate (50 Hz) with a concomitant increase in grating ruggedness against heat and light erasure.

The photoinduced birefringence could be observed in real time using another (interferometric) setup; it built up as a number of pulses incident on the fiber increased, but eventually was found to saturate after about 3 minutes of exposure at 50 Hz pulse repetition rate. Care was taken to meet the beam direction conditions already described for writing the birefringent grating and to ensure that there is a polarization component of the beam orthogonal to z.

Figure 6:
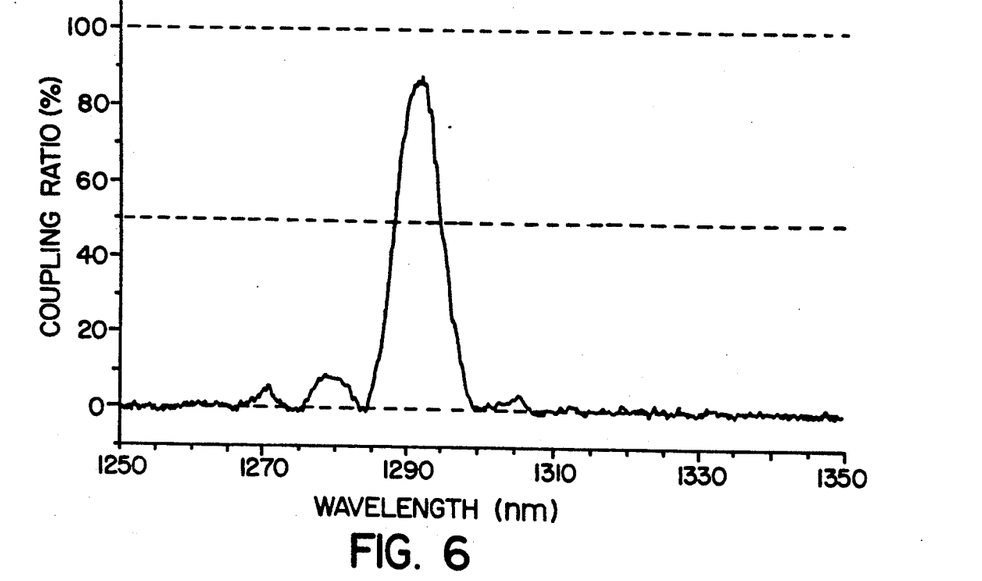
FIG. 6 is a graph of the coupling response for an 85-step rocking filter in which the wavelength divided by the change in wavelength is 170.

Typical polarization conversion efficiencies in a $L = 87$ cm rocking filter are the order of 89% which gives $\kappa L = \sin^{-1}(\sqrt{0.89}) = 1.23$. Using $L_o = 1.02$ cm at 1292 nm; $B = 1.27 \times 10^{-4}$, $\Psi = 7.25 \times 10^{-3}$ radians and finally $(\Delta n_{x'} - \Delta n_{y'}) = 1.83 \times 10^{-6}$ which is consistent with the values of photoinduced birefringence previously reported using internal writing with visible argon-ion laser lines. The response of a successful prototype 1.3 $\mu$m filter is shown in FIG. 6.

Figure 7:
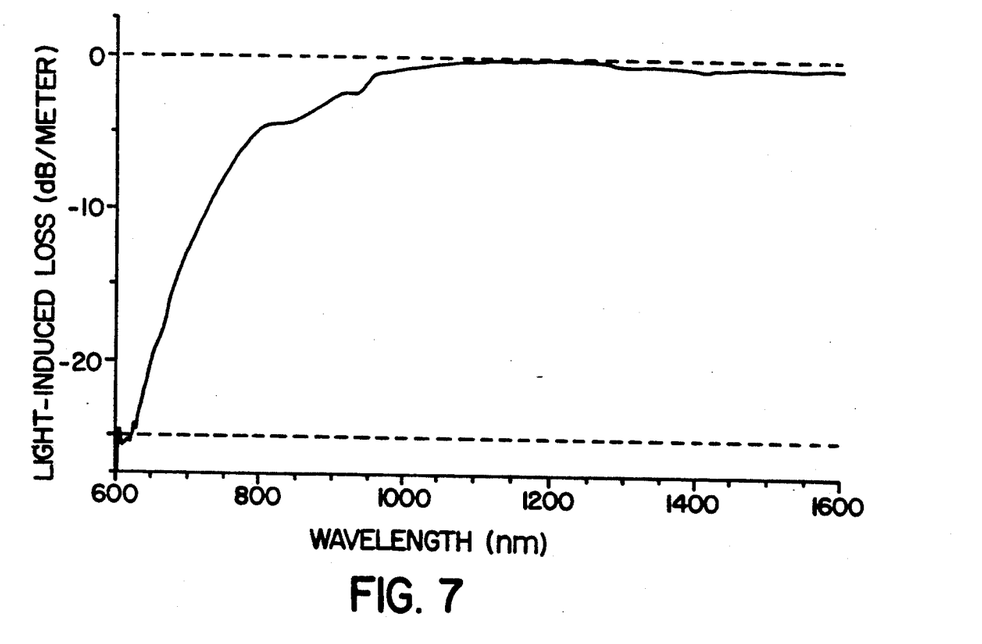
FIG. 7 is a graph illustrating light-induced loss as a function of wavelength for the writing conditions used to fabricate the rocking filters.

There is some loss induced by the ultraviolet writing process; it has the wavelength dispersion shown in FIG. 7. The induced losses however are less than 0.7 dB/meter for wavelengths of interest in optical communications.

Birefringent photosensitivity has thus been obtained using side writing of mode conversion rocking filters in polarization maintaining fiber. The filters are efficient and exhibit near ideal pass band characteristics.

A person understanding this invention may now conceive of alternative structures and embodiments or variations of the above. All of those which fall within the scope of the claims appended hereto are considered to be part of the present invention.

We claim:

1. A method of creating a rocking filter comprising exposing an optical fiber periodically along its length to an ultraviolet light beam which is incident at right angles to the geometric axis of the fiber, is directed $\pi/4$ radians with respect to the principal polarization axes of the fiber and contains an electric field component which is orthogonal to the longitudinal axis of the fiber.

2. A method as defined in claim 1 in which the periodicity of the exposure positions of the fiber is equal to the beat length of a predetermined electromagnetic wavelength.

3. A method as defined in claim 1 in which the fiber contains a core which is Ge doped.

4. A method as defined in claim 3 in which the core is elliptical in cross-section.

5. A method as defined in claim 4 in which the fiber has a cladding which is D shaped in cross-section.

6. A method as defined in claim 2 in which the predetermined wavelength is equal to the polarization beat length of the fiber.

7. A method as defined in claim 6 in which the exposing step includes pulsing the ultraviolet light at a high repetition rate per exposed point.

8. A method as defined in claim 7 in which the number of times the exposed point is pulsed with light is about 250 and the repetition rate is 50 Hz.

9. A method of creating a rocking filter comprising:
(a) disposing a slit mask containing a slit over a side of an optical fiber, the slit having an angle which is at right angles to the geometric axis of the fiber, the mask plane being $\pi/4$ radians with respect to the principal polarization axes of the fiber, and
(b) illuminating the fiber through the slit mask with an ultraviolet light beam which is directed $\pi/4$ radians with respect to the principal polarization axes of the fiber and containing an electric field component which is orthogonal to the longitudinal axis of the fiber,
(c) moving the slit mask a predetermined distance along the fiber, and
(d) repeating steps (a), (b) and (c) a predetermined number of times.

10. A method as defined in claim 9 in which the spatial periodicity of the exposure positions of the fiber is equal to the beat length of the fiber.

11. A method as defined in claim 9, in which the illumination step is performed by pulsing the beam at a rate of about 50 Hz.

12. A method as defined in claim 11 in which the illumination step is performed by pulsing the beam at least about 250 times.

13. A method as defined in claim 9 including generating the ultraviolet light by means of a laser.

14. A method as defined in claim 9 in which the moving and repeating steps are comprised of stepping the relative positions of the optical fiber and the mask in a direction along the axis of the fiber and illuminating successive portions of the fiber following each stepping with pulses of said ultraviolet light to generate an index grating formed of plural spaced grating lines in said fiber.

15. A method as defined in claim 11 in which the moving and repeating steps are comprised of stepping the relative positions of the optical fiber and the mask in a direction along the axis of the fiber and illuminating successive portions of the fiber following each with pulses of said ultraviolet light to generate an index grating formed of plural spaced grating lines in said fiber.

16. A method as defined in claim 14, in which the fiber has an elliptical cross-section core and a D cross-section cladding.

* * * * *